(12) United States Patent
Hwang et al.

(10) Patent No.: US 8,268,109 B2
(45) Date of Patent: Sep. 18, 2012

(54) METHOD OF FORMING POLYMER DISPERSED LIQUID CRYSTAL LAYER INCLUDING DICHROIC DYE

(75) Inventors: Kyu-young Hwang, Seoul (KR); Jae-eun Jang, Seoul (KR); Gae-hwang Lee, Hwaseong-si (KR); Jae-eun Jung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 207 days.

(21) Appl. No.: 12/656,813

(22) Filed: Feb. 17, 2010

(65) Prior Publication Data
US 2011/0067807 A1    Mar. 24, 2011

(30) Foreign Application Priority Data
Sep. 23, 2009 (KR) .................. 10-2009-0090229

(51) Int. Cl.
*B29C 65/02* (2006.01)
*B29C 65/48* (2006.01)
*B29C 63/48* (2006.01)
*B32B 37/14* (2006.01)
*B32B 37/16* (2006.01)
*B32B 38/00* (2006.01)
*C09J 5/06* (2006.01)

(52) U.S. Cl. .................. 156/247; 156/273.3; 156/273.5; 156/307.3; 156/701; 349/113; 349/114; 349/136

(58) Field of Classification Search .................. 156/247, 156/249, 272.2, 273.3, 273.5, 275.1, 275.3, 156/275.5, 307.3, 701; 349/113, 114, 136
See application file for complete search history.

(56) References Cited

U.S. PATENT DOCUMENTS

| | | | |
|---|---|---|---|
| 6,259,506 B1 | 7/2001 | Lawandy | |
| 7,141,279 B2* | 11/2006 | Liang et al. | 428/1.5 |
| 2005/0107522 A1* | 5/2005 | Sheen et al. | 524/588 |

FOREIGN PATENT DOCUMENTS

| | | |
|---|---|---|
| EP | 0 434 366 | 6/1991 |
| JP | 05-142517 | 6/1993 |
| JP | 08-160470 | 6/1996 |
| JP | 08-278490 | 10/1996 |
| JP | 11-095246 | 4/1999 |
| KR | 10-2007-0100037 | 10/2007 |

OTHER PUBLICATIONS

Machine English Translation of JP 08-278490 (Nov. 5, 2011).*
Machine English translation of JP 08-160470 (Nov. 4, 2011).*

* cited by examiner

*Primary Examiner* — Sing P Chan
(74) *Attorney, Agent, or Firm* — Harness, Dickey & Pierce, P.L.C.

(57) ABSTRACT

Example embodiments relate to a method of forming a polymer dispersed liquid crystal (PDLC) layer including a dichroic dye. A first PDLC layer including the dichroic dye and a second PDLC layer having no dichroic dye may be bonded to each other so as to form the desired PDLC layer.

23 Claims, 6 Drawing Sheets

METHOD OF FORMING POLYMER DISPERSED LIQUID CRYSTAL LAYER INCLUDING DICHROIC DYE

CROSS-REFERENCE TO RELATED APPLICATION

This application claims priority under 35 U.S.C. §119 to Korean Patent Application No. 10-2009-0090229, filed on Sep. 23, 2009 with the Korean Intellectual Property Office (KIPO), the entire disclosure of which is incorporated herein by reference.

BACKGROUND

1. Field

The present disclosure relates to methods of forming a polymer dispersed liquid crystal (PDLC) layer, including methods of forming a PDLC layer including a dichroic dye.

2. Description of the Related Art

Conventional polymer dispersed liquid crystal (PDLC) display devices apply an electric field to a PDLC layer in which liquid crystals are uniformly dispersed in a polymer to vary a refractive index of the PDLC layer so that light may be scattered by the PDLC layer or so that light may be transmitted through the PDLC layer. The PDLC display devices may scatter or transmit light by only applying an electric field to the PDLC layer, without using an orientation layer and a polarization plate. A dichroic dye may be mixed in the PDLC layer to realize a display device having improved contrast. The dichroic dye may be distributed according to the movement of the liquid crystals. Thus, when the dichroic dye is mixed in the PDLC layer, the dichroic dye is affected by the movement of the liquid crystals and may be arranged or randomly distributed according to arrangement of the liquid crystals. As a result, optical characteristics of the display device may be affected.

A PDLC layer including a dichroic dye may be conventionally formed by implanting a solution, in which liquid crystals, a photopolymerizable material, and the dichroic dye are mixed, between two substrates and curing the mixed solution using ultraviolet (UV) rays. Because of the curing, the photopolymerizable material is changed into a polymer. The photopolymerizable material may be formed of a monomer or an oligomer. The curing process is performed such that liquid crystals are uniformly dispersed in the polymer, and the dichroic dye is uniformly contained in the polymer and the liquid crystals. However, in a display device including the PDLC layer formed using a conventional method, the dichroic dye contained in the polymer may adversely affect optical characteristics of the display device. Stated more clearly, the arrangement of the dichroic dye contained in the polymer may be fixed as a result of the curing process using UV rays. The fixed dichroic dye is not optically anisotropic and, thus, adversely affects visibility of the display device. Furthermore, the dichroic dye contained in the polymer absorbs UV rays continuously during the curing process using UV rays and, thus, UV ray curing characteristics of the display device may be lowered.

SUMMARY

Example embodiments relate to methods of forming a polymer dispersed liquid crystal (PDLC) layer including a dichroic dye. A method of forming a polymer dispersed liquid crystal (PDLC) layer may include forming a first PDLC layer including a dichroic dye, first liquid crystals, and a first polymer; forming a second PDLC layer including second liquid crystals and a second polymer; and forming a third PDLC layer by bonding a surface of the first PDLC layer to a surface of the second PDLC layer.

Dye molecules of the dichroic dye may be contained within the first liquid crystals and the first polymer of the first PDLC layer. The third PDLC layer may be formed when the dye molecules within the first liquid crystals of the first PDLC layer are diffused into the second liquid crystals of the second PDLC layer.

Forming the first PDLC layer may include providing a first solution including the first liquid crystals, a first photopolymerizable material, and the dichroic dye between a first substrate and a second substrate; curing the first photopolymerizable material by irradiating the first solution with ultraviolet (UV) rays so as to form the first polymer; and removing the second substrate.

A concentration of the dichroic dye in the first solution may be about 0.1 to about 2.0 wt %. A concentration of the first photopolymerizable material in the first solution may be about 1 to about 50 wt %.

Forming the second PDLC layer may include providing a second solution including the second liquid crystals and a second photopolymerizable material between a third substrate and a fourth substrate; curing the second photopolymerizable material by irradiating the second solution with UV rays so as to form the second polymer; and removing the third substrate.

Forming the third PDLC layer may include bonding a surface of the first PDLC layer from which the second substrate is removed to a surface of the second PDLC layer from which the third substrate is removed. The method may further include heating the bonded first and second PDLC layers at a temperature higher than room temperature.

The method may further include forming an adhesion layer on at least one of the surface of the first PDLC layer from which the second substrate is removed or the surface of the second PDLC layer from which the third substrate is removed. The adhesion layer may include a thermal curing material or a photo-curing material.

Another method of forming a polymer dispersed liquid crystal (PDLC) layer may include forming a first PDLC layer including a dichroic dye, first liquid crystals, a first polymer, and an uncured portion; forming a second PDLC layer including second liquid crystals and a second polymer; bonding a surface of the uncured portion of the first PDLC layer to a surface of the second PDLC layer; and forming a third PDLC layer by irradiating the bonded first and second PDLC layers with ultraviolet (UV) rays.

Another method of forming a polymer dispersed liquid crystal (PDLC) layer may include forming a first PDLC layer including a dichroic dye, first liquid crystals, and a first polymer; forming a second PDLC layer including second liquid crystals and a second polymer; forming a third PDLC layer including the dichroic dye, third liquid crystals, and a third polymer by bonding a surface of the first PDLC layer to a surface of the second PDLC layer; and forming a fourth PDLC layer from the third PDLC layer such that dye molecules of the dichroic dye are not within the third polymer.

BRIEF DESCRIPTION OF THE DRAWINGS

The above and/or other aspects of example embodiments may become apparent and readily appreciated when the following description is taken in conjunction with the accompanying drawings of which.

DETAILED DESCRIPTION

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "comprises", "comprising", "includes" and/or "including, when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 1:
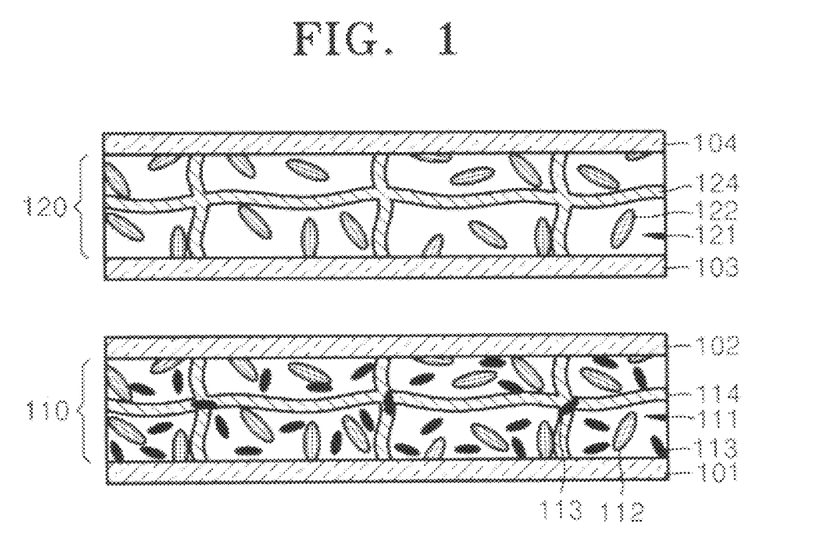
FIGS. 1 through 3 are cross-sectional views illustrating a method of forming a polymer dispersed liquid crystal (PDLC) layer according to example embodiments.
Figure 2:
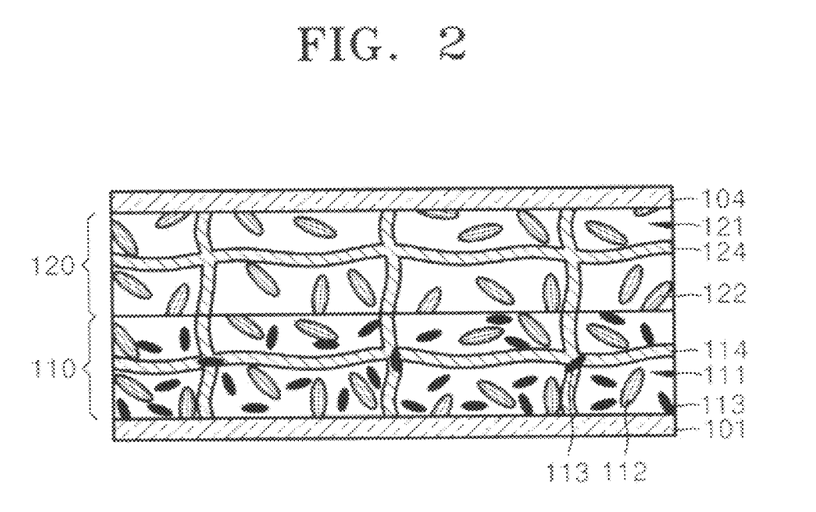
Figure 3:
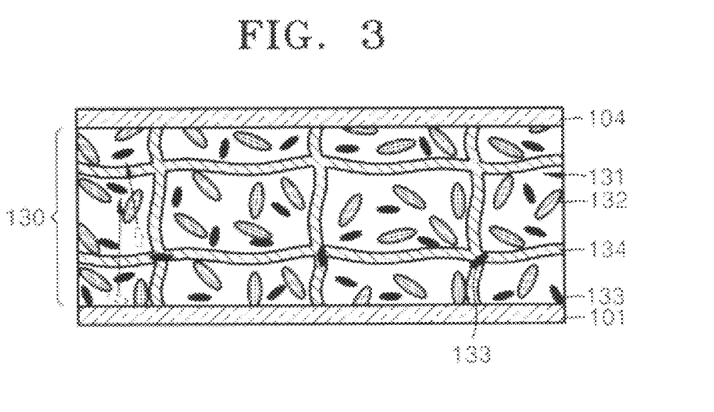

FIGS. 1 through 3 are cross-sectional views illustrating a method of forming a polymer dispersed liquid crystal (PDLC) layer according to example embodiments. Referring to FIG. 1, a first PDLC layer 110 including a dichroic dye and a second PDLC layer 120 having no dichroic dye are formed. The first PDLC layer 110 may be formed by implanting a first solution, in which liquid crystals, a photopolymerizable material and the dichroic dye are mixed, between a first substrate 101 and a second substrate 102 that are spaced apart from each other and irradiating ultraviolet (UV) rays onto the first solution. The first and second substrates 101 and 102 may be formed of a glass or a plastic. However, it should be understood that other suitable materials may be used.

The photopolymerizable material is cured by photopolymerization and, thus, is changed into a polymer. The photopolymerizable material may be at least one of a monomer and oligomer. For example, the concentration of the photopolymerizable material in the first solution may be about 1 to about 50 wt %, although example embodiments are not limited thereto. The dichroic dye may be any of various colors, including black, cyan, yellow, magenta, red, green, or blue. The concentration of the dichroic dye in the first solution may be about 0.1 to about 2.0 wt %, although example embodiments are not limited thereto. For example, the concentration of the dichroic dye may be about 0.5 wt %.

When UV rays are irradiated onto the first solution, in which the photopolymerizable material, the dichroic dye, and the liquid crystals are mixed, for a given amount of time, the photopolymerizable material may be cured by photopolymerization and changed into a polymer, which results in the formation of the first PDLC layer 110. The dichroic dye, first liquid crystals 111, and a first polymer 114 may be included in the first PDLC layer 110. The first polymer 114 may have the form of a network, and the first liquid crystals 111 may be relatively uniformly dispersed in the first polymer 114. Liquid crystal molecules 112 are contained in the first liquid crystals 111, and dye molecules 113 of the dichroic dye are contained in the first liquid crystals 111 and the first polymer 114. The second substrate 102 may be detached from the first PDLC layer 110.

The second PDLC layer 120 may be formed by implanting a second solution, in which liquid crystals and a photopolymerizable material are mixed, between a third substrate 103 and a fourth substrate 104 that are spaced apart from each other and irradiating UV rays onto the second solution. The third and fourth substrates 103 and 104 may be formed of a glass or a plastic, although other suitable materials may be used, as with the first and second substrates 101 and 102. The concentration of the photopolymerizable material in the first solution may be about 1 to about 50 wt %, for example, although example embodiments are not limited thereto. When UV rays are irradiated onto the second solution, in which the photopolymerizable material and the liquid crystals are mixed, for a given amount of time, the photopolymerizable material may be cured by photopolymerization and changed into a polymer, which results in the formation of the second PDLC layer 120. Second liquid crystals 121 and a second polymer 124 may be included in the second PDLC layer 120. The second polymer 124 have the form of a network, and the second liquid crystals 121 may be relatively uniformly dispersed in the second polymer 124. Liquid crystal molecules 122 are contained in the second liquid crystals 121. The third substrate 103 may be detached from the second PDLC layer 120.

Referring to FIG. 2, the first PDLC layer 110 and the second PDLC layer 120 may be bonded to each other. Stated more clearly, a top surface of the first PDLC layer 110 from which the second substrate 102 is removed and a bottom surface of the second PDLC layer 120 from which the third substrate 103 is removed may be bonded to each other.

Referring to FIG. 3, when the first PDLC layer 110 and the second PDLC layer 120 have bonded to each other for a given amount of time, a third PDLC layer 130 may be formed. For instance, when the first PDLC layer 110 and the second PDLC layer 120 are bonded to each other for a given amount of time, the dye molecules 113 contained in the first liquid crystals 111 of the first PDLC layer 110 may pass through the first and second polymers 114 and 124 and enter into the second liquid crystals 121 of the second PDLC layer 120 as a result of diffusion. However, the dye molecules 113 contained within the first polymer 114 do not diffuse into the second PDLC layer 120. When the state of bonding of the first and second PDLC layers 110 and 120 is kept for a given amount of time (e.g., about 0.5 to about 6 hours), diffusion of the dye molecules 113 may be completed so that the third PDLC layer 130 may be formed.

Additionally, when the bonded first and second PDLC layers 110 and 120 are heated at a temperature higher than room temperature (e.g., at a temperature that is higher than room temperature and lower than a temperature at which liquid crystals characteristics are not shown, for example, at a temperature between about 25° C. to about 50° C.), the speed of diffusion of the dye molecules 113 may be increased. The dichroic dye, third liquid crystals 131, and a third polymer 134 may be included in the third PDLC layer 130. The third polymer 134 have the form of a network, and the third liquid crystals 131 may be relatively uniformly dispersed in the third polymer 134. Liquid crystal molecules 132 are contained in the third liquid crystals 131, and dye molecules 133 of the dichroic dye are contained in the third liquid crystals 131 and the third polymer 134.

The concentration of the dye molecules 133 contained in the third polymer 134 of the third PDLC layer 130 is lower than the concentration of the dye molecules 113 contained in the first polymer 114 of the first PDLC layer 110. Stated more clearly, the third PDLC layer 130 may be formed according to the above method so that the concentration of the dichroic dye contained in the third polymer 134, which is cured, may be decreased. In general, a dichroic dye fixedly contained in a polymer that is cured is not optically anisotropic and, thus, adversely affects the visibility of a display device and also lowers UV ray curing characteristics of the display device. However, when using the third PDLC layer 130 in a display device, the concentration of the dichroic dye contained in the cured third polymer 134 may be decreased, and thus, the visibility and the UV ray curing characteristics of the display device may be improved.

Figure 4:
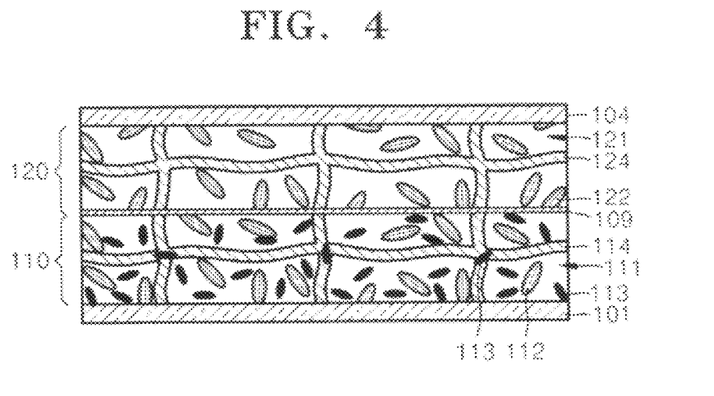
FIGS. 4 and 5 are cross-sectional views illustrating another method of forming a PDLC layer according to example embodiments.
Figure 5:
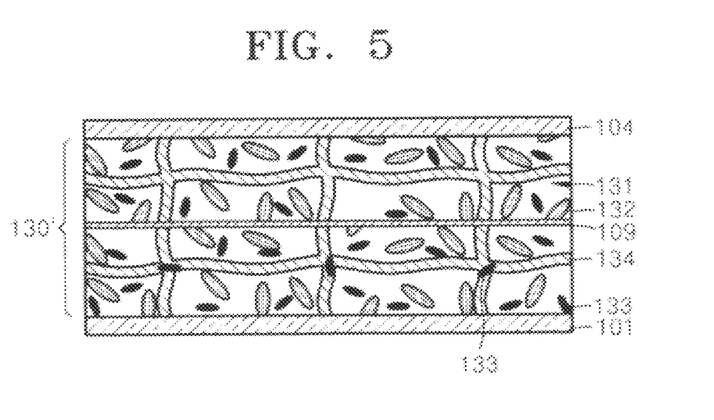

FIGS. 4 and 5 are cross-sectional views illustrating another method of forming a PDLC layer according to example embodiments. Hereinafter, features corresponding to previously discussed elements will not be repeated for purposes of brevity. Instead, the discussion will focus on differences between the current example and the previous example(s). For instance, the first and second PDLC layers 110 and 120 may be formed as described in connection with FIG. 1. As described above, the dichroic dye, the first liquid crystals 111, and the first polymer 114 are contained in the first PDLC layer 110. The second liquid crystals 121 and the second polymer 124 are contained in the second PDLC layer 120. The second substrate 102 may be detached from the first PDLC layer 110, and the third substrate 103 may be detached from the second PDLC layer 120.

Referring to FIG. 4, an adhesion layer 109 may be formed on the top surface of the first PDLC layer 110, on the bottom surface of the second PDLC layer 120, or on both surfaces. The adhesion layer 109 may be formed of a thermal curing material or a photo-curing material, although example embodiments are not limited thereto. As shown in FIG. 4, the first PDLC layer 110 and the second PDLC layer 120 are bonded to each other. The top surface of the first PDLC layer 110 and the bottom surface of the second PDLC layer 120 may be bonded to each other by using the adhesion layer 109.

Referring to FIG. 5, when the first PDLC layer 110 and the second PDLC layer 120 have bonded to each other for a given amount of time, a third PDLC layer 130' may be formed. Stated more clearly, when the first PDLC layer 110 and the second PDLC layer 120 are bonded to each other for a given amount of time, the dye molecules 113 contained in the first liquid crystals 111 of the first PDLC layer 110 may pass through the first and second polymers 114 and 124 and enter into the second liquid crystals 121 of the second PDLC layer 120 as a result of diffusion. When the state of bonding of the first and second PDLC layers 110 and 120 is kept for a given amount of time (e.g., about 0.5 to about 6 hours), diffusion of the dye molecules 113 may be completed so that the third PDLC layer 130' is formed.

Additionally, when the bonded first and second PDLC layers 110 and 120 are heated at a temperature higher than room temperature, the speed of diffusion of the dye molecules 113 may be increased. After diffusion of the dye molecules 113 has completed, heat may be applied or light may be irradiated onto the adhesion layer 109 to cure the adhesion layer 109 so as to improve adhesion between the first and second PDLC layers 110 and 120. The dichroic dye, the third liquid crystals 131, and the third polymer 134 may be included in the third PDLC layer 130'. As a result of the formation of the third PDLC layer 130', the concentration of the dichroic dye contained in the third polymer 134 may be decreased compared to the concentration of the dye molecules 113 contained in the first polymer 114 of the first PDLC layer 110. Because of the adhesion layer 109, the adhesion force between the first and second PDLC layers 110 and 120 may be improved.

Figure 6:
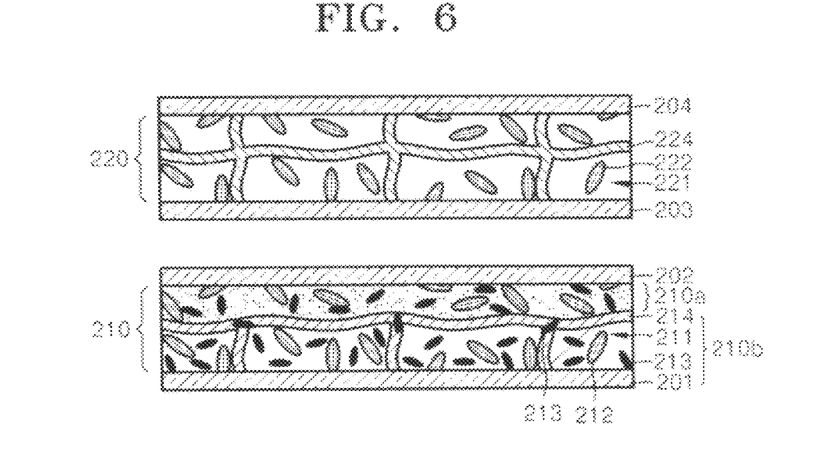
FIGS. 6 through 8 are cross-sectional views illustrating another method of forming a PDLC layer according to example embodiments.
Figure 7:
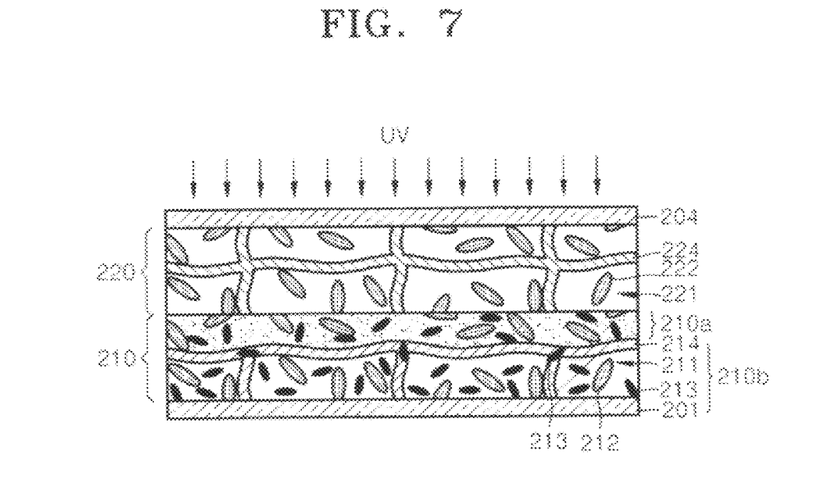
Figure 8:
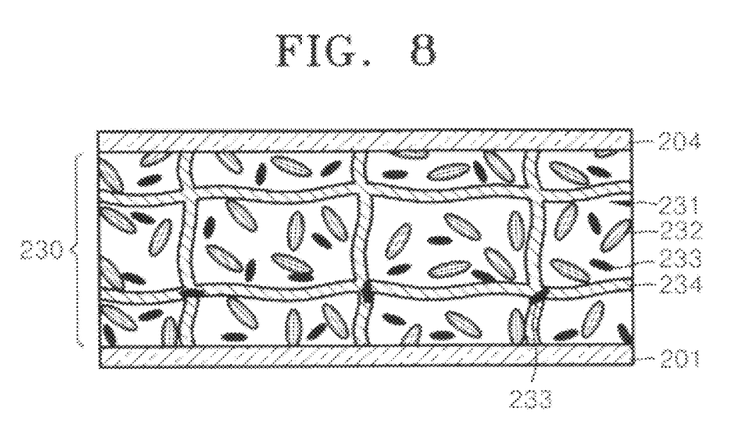

FIGS. 6 through 8 are cross-sectional views illustrating another method of forming a PDLC layer according to example embodiments. Hereinafter, features corresponding to previously discussed elements will not be repeated for purposes of brevity. Instead, the discussion will focus on the differences between the current example and the previous example(s).

Referring to FIG. 6, a first PDLC layer 210 including a dichroic dye and a second PDLC layer 220 having no dichroic dye are formed. The first PDLC layer 210 may be formed to include an uncured portion 210a. For instance, a first solution, in which liquid crystals, a photopolymerizable material, and the dichroic dye are mixed, may be implanted between a first substrate 201 and a second substrate 202 that are spaced apart from each other. The first and second substrates 201 and 202 may be formed of a glass or a plastic, although other suitable materials may be used. At least one of a monomer and oligomer may be used as the photopolymerizable material. For instance, the concentration of the photopolymerizable material in the first solution may be about 1 to about 50 wt %, although example embodiments are not limited thereto. The dichroic dye may have various colors, including black, cyan, yellow, magenta, red, green, or blue. The concentration of the dichroic dye in the first solution may be about 0.1 to about 2.0 wt %, although example embodiments are not limited thereto. For example, the concentration of the dichroic dye may be about 0.5 wt %.

The first solution may be irradiated with UV rays. For instance, when the irradiation of UV rays is controlled, the first PDLC layer 210 may be formed to have a portion of the photopolymerizable material not cured. The uncured portions 210a of the first PDLC layer 210 may include the liquid crystals, the photopolymerizable material, and the dichroic dye. The cured portions 210b of the first PDLC layer 210 may include the dichroic dye, first liquid crystals 211, and a first polymer 214. In the cured portions 210b, the first polymer 214 have the form of a network, and the first liquid crystals 211 may be relatively uniformly dispersed in the first polymer 214. Liquid crystal molecules 212 are contained in the first liquid crystals 211, and dye molecules 213 in the dichroic dye are contained in the first liquid crystals 211 and the first polymer 214. The second substrate 202 may be detached from the uncured portions 210a of the first PDLC layer 210.

The second PDLC layer 220 may be formed by implanting a second solution, in which liquid crystals and a photopolymerizable material are mixed, between a third substrate 203 and a fourth substrate 204 that are spaced apart from each other and irradiating UV rays onto the second solution. The third and fourth substrates 203 and 204 may be formed of a glass or a plastic, although other suitable materials may be used. The concentration of the photopolymerizable material in the first solution may be about 1 to about 50 wt %, although example embodiments are not limited thereto. When UV rays are irradiated onto the second solution, in which the photopolymerizable material and the liquid crystals are mixed, for a given amount of time, the photopolymerizable material may be cured by photopolymerization and changed into a polymer, which results in the formation of the second PDLC layer 220. Second liquid crystals 221 and a second polymer 224 may be included in the second PDLC layer 220. The second polymer 224 may have the form of a network, and the second liquid crystals 221 may be relatively uniformly dispersed in the second polymer 224. Liquid crystal molecules 222 are contained in the second liquid crystals 221. The third substrate 203 may be detached from the second PDLC layer 220.

Referring to FIG. 7, the first PDLC layer 210 and the second PDLC layer 220 are bonded to each other. For instance, a top surface of the uncured portion 210a of the first PDLC layer 210 and a bottom surface of the second PDLC layer 220 may be bonded to each other. When the first PDLC layer 210 and the second PDLC layer 220 are bonded to each other, the dye molecules 213 contained in the uncured portion 210a and contained in the first liquid crystals 211 of the first PDLC layer 210 may pass through the first and second polymer 214 and 224 and may enter into the second liquid crystals 221 of the second PDLC layer 220 as a result of diffusion. The dye molecules 213 contained in the first polymer 214 do not diffuse into the second PDLC layer 220. When the state of bonding of the first and second PDLC layers 210 and 220 is kept for a given amount of time (e.g., about 0.5 to about 6 hours), the diffusion of the dye molecules 213 may be completed. Additionally, when the bonded first and second PDLC layers 210 and 220 are heated at a temperature higher than room temperature, the speed of diffusion of the dye molecules 213 may be increased.

Referring to FIG. 8, when diffusion of the dye molecules 213 is occuring or is completed, UV rays may be irradiated onto the uncured portion 210a of the first PDLC layer 210 so that a cured third PDLC layer 230 may be formed. The dichroic dye, third liquid crystals 231, and a third polymer 234 may be included in the third PDLC layer 230. The third polymer 234 may have the form of a network, and the third liquid crystals 231 may be relatively uniformly dispersed in the third polymer 234. Liquid crystal molecules 232 may be contained in the third liquid crystals 231, and dye molecules 233 of the dichroic dye may be contained in the third liquid crystals 231 and the third polymer 234.

Because the dye molecules 213 are dispersed into the second liquid crystals 221 from the uncured portions 210a of the first PDLC layer 210, movement of the dye molecules 213 may be promoted. Thus, in the third PDLC layer 230, the concentration of the dye molecules 233 contained in the cured third polymer 234 may be further decreased. Also, an additional process of irradiating UV rays onto the uncured portions 210a may be performed when the first and second PDLC layers 210 and 220 are bonded to each other so as to improve an adhesion force between the first and second PDLC layers 210 and 220.

FIGS. 9 through 13 are cross-sectional views illustrating another method of forming a PDLC layer according to example embodiments. Hereinafter, features corresponding to previously discussed elements will not be repeated for purposes of brevity. Instead, the discussion will focus on differences between the current example and the previous example(s).

Figure 9:
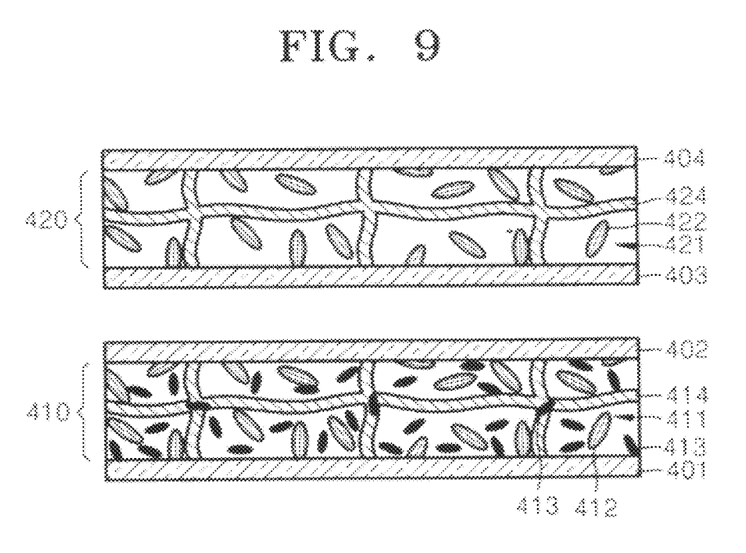
FIGS. 9 through 13 are cross-sectional views illustrating another method of forming a PDLC layer according to example embodiments.

Referring to FIG. 9, a first PDLC layer 410 including a dichroic dye and a second PDLC layer 420 having no dichroic dye are formed. The first PDLC layer 410 may be formed by implanting a first solution, in which liquid crystals, a photopolymerizable material, and the dichroic dye are mixed, between a first substrate 401 and a second substrate 402 that are spaced apart from each other and irradiating UV rays onto the first solution. The first and second substrates 401 and 402 may be formed of a glass or a plastic, although other suitable materials may be used. The photopolymerizable material may be formed of at least one of a monomer and oligomer. The concentration of the photopolymerizable material in the first solution may be about 1 to about 50 wt %, although example embodiments are not limited thereto. The concentration of the dichroic dye in the first solution may be about 0.1 to about 2.0 wt %, although example embodiments are not limited thereto. For example, the concentration of the dichroic dye may be about 0.5 wt %.

When UV rays are irradiated onto the first solution, in which the photopolymerizable material, the dichroic dye, and the liquid crystals are mixed, for a given amount of time, the first PDLC layer 410 may be cured. The dichroic dye, first liquid crystals 411, and a first polymer 414 may be included in the cured first PDLC layer 410. The first polymer 414 may have the form of a network, and the first liquid crystals 411 may be relatively uniformly dispersed in the first polymer 414. Liquid crystal molecules 412 may be contained in the first liquid crystals 411, and dye molecules 413 of the dichroic dye may be contained in the first liquid crystals 411 and the first polymer 414. The second substrate 402 may be detached from the first PDLC layer 410.

The second PDLC layer 420 may be formed by implanting a second solution, in which liquid crystals and a photopolymerizable material are mixed, between a third substrate 403 and a fourth substrate 404 that are spaced apart from each other and irradiating UV rays onto the second solution. The third and fourth substrates 403 and 404 may be formed of a glass or a plastic, although other suitable materials may be used. The concentration of the photopolymerizable material in the first solution may be about 1 to about 50 wt %, although example embodiments are not limited thereto. When UV rays are irradiated onto the second solution, in which the photopolymerizable material and the liquid crystals are mixed, for a given amount of time, the second PDLC layer 420 may be cured. Second liquid crystals 421 and a second polymer 424 may be included in the second PDLC layer 420. The second polymer 424 may have the form of a network, and the second liquid crystals 421 may be relatively uniformly dispersed in the second polymer 424. Liquid crystal molecules 422 may be contained in the second liquid crystals 421. The third substrate 403 may be detached from the second PDLC layer 420.

Figure 10:
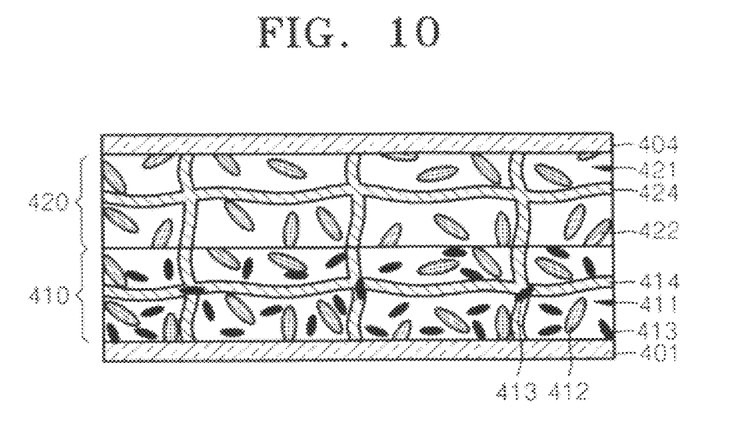

Referring to FIG. 10, the first PDLC layer 410 and the second PDLC layer 420 are bonded to each other. For example, a top surface of the first PDLC layer 410 from which the second substrate 402 is removed and a bottom surface of the second PDLC layer 420 from which the third substrate 403 is removed may be bonded to each other.

Figure 11:
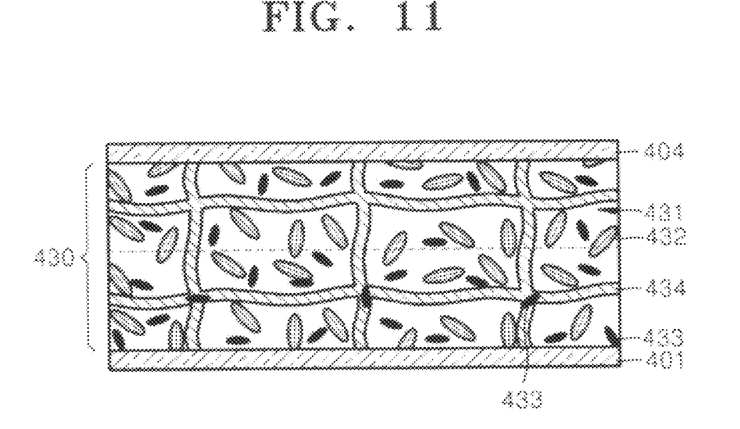

Referring to FIG. 11, when the first PDLC layer 410 and the second PDLC layer 420 are bonded to each other for a given amount of time, a third PDLC layer 430 may be formed. Stated more clearly, when the first PDLC layer 410 and the second PDLC layer 420 are bonded to each other for a given amount of time, the dye molecules 413 contained in the first liquid crystals 411 of the first PDLC layer 410 may pass through the first and second polymers 414 and 424 and enter into the second liquid crystals 421 of the second PDLC layer 420. The dye molecules 413 contained within the first polymer 414 do not diffuse into the second PDLC layer 420. When the state of bonding of the first and second PDLC layers 410 and 420 is kept for a given amount of time (e.g., about 0.5 to about 6 hours), diffusion of the dye molecules 413 is completed so that the third PDLC layer 430 may be formed.

Additionally, when the bonded first and second PDLC layers 410 and 420 are heated at a temperature higher than room temperature, the speed of diffusion of the dye molecules 413 may be increased. The dichroic dye, the third liquid crystals 431, and the third polymer 434 may be included in the third PDLC layer 430. The third polymer 434 may have the form of a network, and the third liquid crystals 431 may be relatively uniformly dispersed in the third polymer 434. Liquid crystal molecules 432 may be contained in the third liquid crystals 431, and dye molecules 433 of the dichroic dye may be contained in the third liquid crystals 431 and the third polymer 434. Because the third PDLC layer 430 is formed when the dye molecules 413 contained in the first liquid crystals 411 are being diffused into the second liquid crystals 421, the dye molecules 433 are not contained within the third polymer 434 formed in an upper portion of the third PDLC layer 430.

Figure 12:
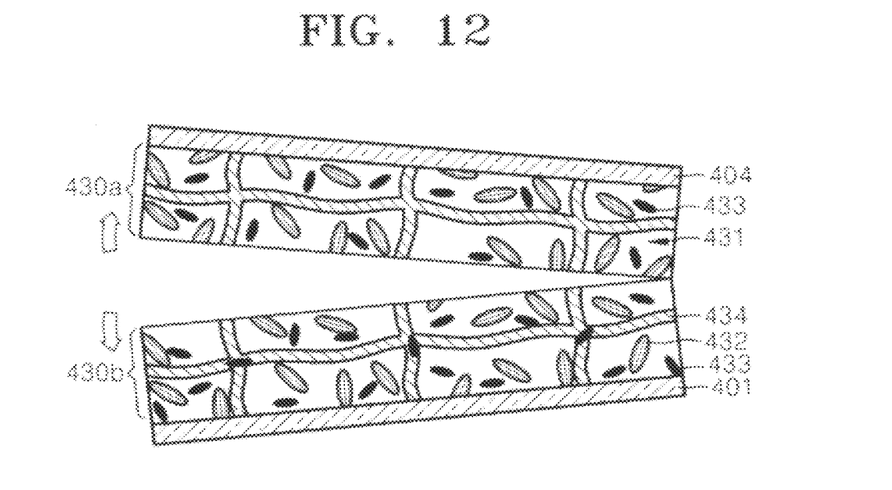

Referring to FIG. 12, an upper portion and a lower portion of the third PDLC layer 430 may be separated from each other. The dye molecules 433 are not included in the third polymer 434 formed in the upper portion of the third PDLC layer 430 but are included within the third polymer 434 formed in the lower portion of the third PDLC layer 430. Thus, a fourth PDLC layer 430a in which the dye molecules 433 are not contained within the third polymer 434 and a fifth PDLC layer 430b in which the dye molecules 433 are contained within the third polymer 434 may be formed.

Figure 13:
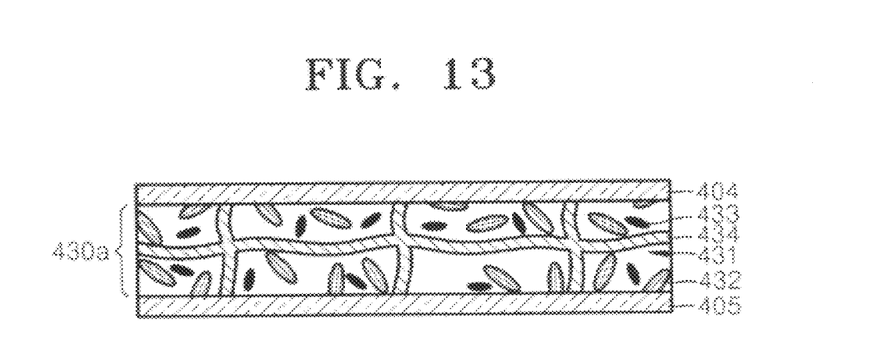

Referring to FIG. 13, a fifth substrate 405 may be formed on a bottom surface of the fourth PDLC layer 430a. The fifth substrate 405 may be formed of a glass or a plastic, although other suitable materials may be used. As a result, the fourth PDLC layer 430a, in which the dye molecules 433 are not contained within the third polymer 434, may be formed.

According to example embodiments, a PDLC layer including a dichroic dye and a PDLC layer having no dichroic dye may be bonded to each other so that a PDLC layer in which the amount of the dichroic dye contained in a polymer may be reduced may be formed. Furthermore, portions in which dye molecules are not contained within a polymer may be separated from an existing PDLC layer so that a new PDLC layer in which a dichroic dye is contained only in the liquid crystals may be formed. As a result, the visibility and UV ray curing characteristics of a display device may be further improved.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. A method of forming a polymer dispersed liquid crystal (PDLC) layer, the method comprising:
    forming a first PDLC layer including a dichroic dye, first liquid crystals, and a first polymer;
    forming a second PDLC layer including second liquid crystals and a second polymer; and
    forming a third PDLC layer by bonding a surface of the first PDLC layer to a surface of the second PDLC layer.

2. The method of claim 1, wherein dye molecules of the dichroic dye are within the first liquid crystals and the first polymer of the first PDLC layer.

3. The method of claim 2, wherein the third PDLC layer is formed when the dye molecules within the first liquid crystals of the first PDLC layer are diffused into the second liquid crystals of the second PDLC layer.

4. The method of claim 1, wherein forming the first PDLC layer includes:
    providing a first solution including the first liquid crystals, a first photopolymerizable material, and the dichroic dye between a first substrate and a second substrate;
    curing the first photopolymerizable material by irradiating the first solution with ultraviolet (UV) rays so as to form the first polymer; and
    removing the second substrate.

5. The method of claim 4, wherein a concentration of the dichroic dye in the first solution is about 0.1 to about 2.0 wt %.

6. The method of claim 4, wherein a concentration of the first photopolymerizable material in the first solution is about 1 to about 50 wt %.

7. The method of claim 4, wherein forming the second PDLC layer includes:
   providing a second solution including the second liquid crystals and a second photopolymerizable material between a third substrate and a fourth substrate;
   curing the second photopolymerizable material by irradiating the second solution with UV rays so as to form the second polymer; and
   removing the third substrate.

8. The method of claim 7, wherein forming the third PDLC layer includes bonding a surface of the first PDLC layer from which the second substrate is removed to a surface of the second PDLC layer from which the third substrate is removed.

9. The method of claim 8, further comprising:
   heating the bonded first and second PDLC layers at a temperature higher than room temperature.

10. The method of claim 8, further comprising:
    forming an adhesion layer on at least one of the surface of the first PDLC layer from which the second substrate is removed or the surface of the second PDLC layer from which the third substrate is removed.

11. The method of claim 10, wherein the adhesion layer includes a thermal curing material or a photo-curing material.

12. A method of forming a polymer dispersed liquid crystal (PDLC) layer, the method comprising:
    forming a first PDLC layer including a dichroic dye, first liquid crystals, a first polymer, and an uncured portion;
    forming a second PDLC layer including second liquid crystals and a second polymer;
    bonding a surface of the uncured portion of the first PDLC layer to a surface of the second PDLC layer; and
    forming a third PDLC layer by irradiating the bonded first and second PDLC layers with ultraviolet (UV) rays.

13. The method of claim 12, wherein forming the first PDLC layer includes:
    providing a first solution including the first liquid crystals, a first photopolymerizable material, and the dichroic dye between a first substrate and a second substrate;
    curing the first photopolymerizable material by irradiating the first solution with UV rays so as to form the first polymer while leaving an uncured portion; and
    removing the second substrate.

14. The method of claim 13, wherein a concentration of the dichroic dye in the first solution is about 0.1 to about 2.0 wt %.

15. The method of claim 13, wherein a concentration of the first photopolymerizable material in the first solution is about 1 to about 50 wt %.

16. The method of claim 12, wherein forming the second PDLC layer includes:
    providing a second solution including the second liquid crystals and a second photopolymerizable material between a third substrate and a fourth substrate;
    curing the second photopolymerizable material by irradiating the second solution with UV rays so as to form the second polymer; and
    removing the third substrate.

17. A method of forming a polymer dispersed liquid crystal (PDLC) layer, the method comprising:
    forming a first PDLC layer including a dichroic dye, first liquid crystals, and a first polymer;
    forming a second PDLC layer including second liquid crystals and a second polymer;
    forming a third PDLC layer including the dichroic dye, third liquid crystals, and a third polymer by bonding a surface of the first PDLC layer to a surface of the second PDLC layer; and
    forming a fourth PDLC layer from the third PDLC layer such that dye molecules of the dichroic dye are not within the third polymer.

18. The method of claim 17, wherein forming the first PDLC layer includes:
    providing a first solution including the first liquid crystals, a first photopolymerizable material, and the dichroic dye between a first substrate and a second substrate;
    curing the first photopolymerizable material by irradiating the first solution with UV rays so as to form the first polymer; and
    removing the second substrate.

19. The method of claim 18, wherein a concentration of the dichroic dye in the first solution is about 0.1 to about 2.0 wt %.

20. The method of claim 18, wherein a concentration of the first photopolymerizable material in the first solution is about 1 to about 50 wt %.

21. The method of claim 17, wherein forming the second PDLC layer includes:
    providing a second solution including the second liquid crystals and a second photopolymerizable material between a third substrate and a fourth substrate;
    curing the second photopolymerizable material by irradiating the second solution with UV rays so as to form the second polymer; and
    removing the third substrate.

22. The method of claim 21, wherein forming the fourth PDLC layer includes separating from the third PDLC layer a portion in which the dye molecules of the dichroic dye are not within the third polymer.

23. The method of claim 22, further comprising:
    forming a fifth substrate on an exposed surface of the fourth PDLC layer that is separated from the third PDLC layer.

* * * * *